United States Patent [19]

Dünwald et al.

[11] 4,100,144

[45] Jul. 11, 1978

[54] PROCESS FOR THE PREPARATION OF OLIGOURETHANES

[75] Inventors: Willi Dünwald, Leverkusen; Jürgen Lewalter, Odenthal; Rudolf Merten, Leverkusen; Hans-Jürgen Müller, Cologne, all of Germany

[73] Assignee: Bayer Aktiengesellschaft, Leverkusen, Germany

[21] Appl. No.: 803,718

[22] Filed: Jun. 6, 1977

[30] Foreign Application Priority Data

Jun. 11, 1976 [DE] Fed. Rep. of Germany ....... 2626175

[51] Int. Cl.$^2$ .............................................. C08G 18/08
[52] U.S. Cl. ....................................... 260/860; 528/60
[58] Field of Search ................... 260/471 C, 77.5 MA

[56] References Cited

FOREIGN PATENT DOCUMENTS 2,404,740  8/1975  Fed. Rep. of Germany ...... 260/77.5 MA

*Primary Examiner*—M. J. Welsh
*Attorney, Agent, or Firm*—Gene Harsh; Lawrence S. Pope

[57] ABSTRACT

This invention relates to a new process for the preparation of oligourethanes having isocyanate end groups blocked with alkanol and/or cycloalkanol groups, the compounds which can be obtained by this process and their use for the production of polyurethane resins by the isocyanate polyaddition process.

10 Claims, No Drawings

PROCESS FOR THE PREPARATION OF OLIGOURETHANES

BACKGROUND OF THE INVENTION

The preparation of polyisocyanates having blocked isocyanate groups and their use in combination with polyhydroxyl compounds for the production of polyurethane resins and in particular for the production of stoving lacquers is already known (see e.g. Kunststoff-Handbuch, Volume VII, Polyurethane, 1966, Carl-Hanser-Verlag, Munich, pages 17 and 24). The blocking agents used in practice, apart from phenols, are mainly oximes and ε-caprolactam. In addition to ensuring sufficient storage stability of the combination of blocked polyisocyanate and polyhydroxyl compound at room temperature, these blocking agents also ensure sufficient reactivity of the combinations at elevated temperatures.

The above mentioned combinations already known in the art are in practice used in the form of relatively dilute solutions having a solids content of about 20–50% by weight. Attempts to introduce solvent-free or low solvent stoving lacquers have failed in practice due to processing difficulties, because there is usually a close correlation between solids content, viscosity and flow. On the other hand, there are strict limits to the possibility of lowering the viscosity by increasing the temperature employed for processing the systems because a rise in temperature normally eliminates the latent blocking of the isocyanate groups, with the result that the lacquers undergo an undesirable increase in viscosity and finally may even gel. Another considerable disadvantage of the above mentioned combinations known in the art, in particular the combination based on polyisocyanates blocked with phenol groups, lies in the toxicity of the phenol split off during the stoving process.

There have therefore been several attempts to replace the above mentioned blocking agents, in particular phenols, by blocking agents which are not only nontoxic but also provide for problem-free processing with solvent-free or low solvent systems.

A partial solution to this problem can be seen in the process according to German Offenlegungsschrift No. 2,404,740 which corresponds to U.S. Patent Application Ser. No. 544,620 filed Jan. 28, 1975. When the alkanol-blocked or cycloalkanol-blocked isocyanates mentioned in this publication are used in combination with the usual polyhydroxyl compounds, they give rise to low viscosity, solvent-free systems which are stable in storage even at temperatures above about 150° C. The blocked polyisocyanates mentioned in the above prior publication mainly consist of clearly defined, relatively low molecular weight organic compounds which are liable to undergo partial evaporation under the conditions employed for wire lacquering and may thus result in considerable stoving losses during the lacquering process. Moreover, the alkanol-blocked and cycloalkanol-blocked polyisocyanates mentioned in the aforesaid prior publication could not be used satisfactorily in systems containing solvent because the stoving time required for evaporating off the solvents and reaching the high temperature necessary for liberating the blocked polyisocyanates is too long and results in unsatisfactory film properties in the case of the above described systems based on combinations of polyhydroxyl compounds and low molecular weight polyisocyanates blocked with alkanol or cycloalkanol.

It was, therefore, an object of the present invention to provide a method of obtaining blocked polyisocyanates which would not have the disadvantages described above but could be used universally, i.e. both in solvent-free systems and in systems containing solvents, and could result in satisfactory stoving lacquers, in particular wire lacquers, without at the same time contaminating the environment with toxic blocking agents.

It was surprisingly found that this problem could be solved by the process according to the invention which is described below, in which oligourethanes having isocyanate end groups blocked with alkanol or cycloalkanol are obtained.

SUMMARY OF THE INVENTION

The present invention relates to a process for the preparation of oligourethanes having isocyanate end groups blocked with alkanol and/or cycloalkanol groups, by the reaction of aromatic polyisocyanates with monohydric and polyhydric alcohols having aliphatically and/or cycloaliphatically bound hydroxyl groups, characterized in that aromatic polyisocyanates are reacted with about 0.7 to 1.5 times the equivalent quantity, in terms of the NCO/OH reaction, of monohydric and polyhydric alcohols containing aliphatically and/or cycloaliphatically bound hydroxyl groups, the proportion of monohydric to polyhydric alcohols being chosen so that the total quantity of alcoholic hydroxyl groups present is composed of about 30 to 70% of hydroxyl groups of one or more monohydric alcohols and about 70 to 30% of hydroxyl groups of one or more polyhydric alcohols, the reaction being carried out in either one or more steps by introducing the total quantity of alcohol component into the reaction vessel as a mixture and adding the polyisocyanate to this mixture or by introducing into the reaction vessel a quantity of alcohol component amounting to at least about 70 equivalents percent in terms of the NCO/OH reaction and reacting this alcohol component with the total quantity of polyisocyanate, followed by addition of the remaining quantity of alcohol to the prepolymer initially obtained, which contain free isocyanate groups. If the second method is employed, at least about 50 equivalents percent of the total quantity of polyhydric alcohol component is already present in the alcohol mixture originally introduced into the reaction vessel.

The present invention also relates to the oligourethanes which can be obtained by this process.

Lastly, the present invention relates to the use of oligourethanes which can be obtained by this process as polyisocyanates with blocked isocyanate groups in combination with polyhydroxyl compounds for the production of polyurethane resins by the isocyanate polyaddition process.

DETAILED DESCRIPTION OF THE INVENTION

The oligourethanes obtained by the process according to the invention have, in particular, the following advantages:

1. The proportion of the low molecular weight blocked polyisocyanates is considerably lower than in the blocked polyisocyanates described in German Offenlegungsschrift No. 2,404,740, which corresponds to U.S. Patent Application Ser. No. 544,620 filed Jan. 28, 1975 with the result that significant stoving losses are no longer observed when stoving the lacquers obtained from the oligourethanes;

2. the oligourethanes obtained as products of the process according to the invention already constitute a preliminary stage of the polyurethane present in the cured lacquer so that the use of these oligourethanes instead of the low molecular weight blocked polyisocyanates used in the art results in considerably more rapid and uniform film formation; and 3. since the products according to the invention are not specific chemical compounds but mixtures, they have a much more suitable melting and softening range than the blocked polyisocycanates known in the art.

When carrying out the process according to the invention, it it essential to ensure either that the total quantity of alcohol component or at least about 70 equivalent percent thereof, is initially introduced into the reaction vessel and the polyisocyanate used as starting material is then introduced into this alcohol mixture. Addition of the polyisocyanate may be carried out either continuously or portionwise with vigorous stirring. It was surprisingly found that if the process is reversed, i.e. if the alcohol component is added to the polyisocyanate component, the advantageous results according to the invention are not obtained (Example 2).

When carrying out the process according to the invention, the total quantity of reactants used is calculated so that from about 0.7 to 1.5, preferably about 0.95 to 1.1, hydroxyl groups of the alcohol component are available for each isocyanate group in the polyisocyanate used as starting component. Additional (monohydric) alcohol may, of course, be added after termination of the reaction according to the invention. This additional alcohol would then merely function as solvent since even·in the case where an excess of isocyanate groups has been used in the process of the invention products are obtained which are substantially free from isocyanate groups due to secondary reactions of the excess isocyanate groups such as carbodiimide, isocyanurate, uretdione or allophanate formation.

The quantities of monohydric and polyhydric alcohols present in the alcohol component is calculated so that the total quantity of hydroxyl groups in the alcohol component is composed of from about 30 to 70%, preferably about 40 to 60% of hydroxyl groups of one or more monohydric alcohols and about 70 to 30%, preferably about 60 to 40%, of hydroxyl groups of polyhydric alcohols. When these amounts of reactants are used the preferred products of the invention having average molecular weights of about 400 to 5000 most preferred of about 500 to 2000 are obtained.

If less than the total quantity of alcohol component is originally introduced into the reaction vessel when carrying out the process according to the invention, care must be taken to ensure that the alcohol component initially introduced contains at least about 50 equivalent % of the polyhydric alcohol.

The process according to the invention is generally carried out at temperatures of from about 0° to 250° C, preferably about 20° to 180° C. The reactants may be brought together at room temperature, for example, the exothermic reaction then taking place at temperatures of up to about 250° C, preferably up to about 180° C and in particular about 70° to 150° C, optionally with simultaneous external heating. Termination of the reaction according to the invention can be observed by a slowing down of the evolution of heat. In a preferred embodiment of the process according to the invention, about 40 to 60% by weight of the polyisocyanate component is first added to the mixture of alcohol component in the reaction vessel at a temperature within the range of room temperature to about 80° C, preferably about 30° to 50° C, and the remaining about 60 to 40% by weight of polyisocyanate component are added after after termination of the exothermic reaction, at about 70° to 150° C, preferably about 90° to 120° C, and the reaction is then completed within the temperature ranges indicated above.

Suitable polyisocyanates for use as starting materials in the process according to the invention include, in particular, polyisocyanates, preferably diisocyanates, which have aromatically bound isocyanate groups, e.g. phenylene-1,3- and -1,4-diisocyanate; tolylene-2,4-and-2,6-diisocyanate and any mixtures of these isomers; diphenylmethane-2,4- and/or 4,4'-diisocyanate; naphthylene-1,5-diisocyanate and triphenylmethane-4,4',4"-triisocyanate or polyphenylpolymethylene polyisocyanate of the kind which can be obtained by aniline-formaldehyde condensation followed by phosgenation and which have been described, for example, in British Patent Specification No. 874,430 and No. 848,671.

Particularly suitable polyisocyanates are 2,4-diisocyanatotoluene; 2,6-diisocyanatotoluene; commercial mixtures of these isomers and 4,4'-diisocyantodiphenylmethane.

Suitable monohydric alcohols for the process according to the invention include those having aliphatically or cycloaliphatically bound hydroxyl groups. The preferred monohydric alcohols have a molecular weight of about 32 to 250. Examples include alkanols such as methanol, ethanol, n-propanol or n-octanol, aralkanols (which are also regarded as alkanols in the context of this invention) such as benzyl alcohol or 2-phenylethanol and cycloalkanols such as cyclopentanol or cyclohexanol. Alkanols having ether groups, e.g. 2-methoxyethanol, 2-ethoxyethanol, diethyleneglycol monomethylether or diethylene glycol monoethylether, are also suitable.

Polyhydric alcohols are suitable for the process according to the invention include polyhydric alcohols having alphatically or cycloaliphatically bound hydroxyl groups. Diols and/or triols containing aliphatically bound hydroxyl groups and having molecular weights in the range of about 60 to 250 are preferred.

Suitable polyhydric alcohols include e.g. ethylene glycol; propane-1,2-diol; propane-1,3-diol; butane-1,4-diol; butane-1,2-diol; pentane-1,2-diol; hexane-1,6-diol; diethyleneglycol; triethylene glycol; tetraethyleneglycol; polyethyleneglycols having up to about 50 ethylene oxide units; dipropylene glycol; tripropyleneglycol; tetrapropyleneglycol; glycerol; hexanetriol; trimethylolpropane; trimethylolethane; pentaerythritol; 4,4'-bis-(2-hydroxyethyl)-diphenylpropane-(2,2); quinitol; maleic acid-bis-ethylene glycol ester; adipic acidbis-ethylene glycol ester and benzene-dicarboxylic acid-bisethylene glycol ester.

Higher molecular weight polyols, for example with molecular weight of from about 250 to 2000, may also be used or included in minor proportions, but are not preferred. Such compounds include, for example, the known polyhydroxyl polyesters which can be obtained from dicarboxylic acids such as phthalic acid, isoterephthalic acid or adipic acid with excess quantities of diols of the kind already mentioned, but trifunctional components could, of course, also be added to obtain the necessary degree of branching if desired. Suitable compounds of this kind also include the known polyhydroxyl polyethers which can be obtained by alkoxylation of low molecular weight starter molecules, for example the low molecular weight polyols mentioned above by way of example or water or amines having at least two active hydrogen atoms.

The process according to the invention may, of course, also be carried out using mixtures of the above mentioned monohydric alcohols or mixtures of the above mentioned polyhydric alcohols.

Inert additives, i.e. substances which do not interfere with the reaction under the reaction conditions, may, of course, also be used as diluents or levelling agents in the process according to the invention. Examples of such additives include diphenyl, diphenylether, dibenzylketone, naphthalene, $\epsilon$-caprolactone, $\gamma$-butyrolactone or also $\epsilon$-caprolactam, which is much less reactive with isocyanate groups then the alcohols put into the reaction and may, therefore, be regarded as an inert component. The usual lacquer solvents may, of course, also be added.

The oligourethanes obtained in the process according to the invention may be combined and processed at temperatures of from about $-20°$ C to $250°$ C, preferably about $20°$ to $180°$ C, with compounds containing groups which are reactive with isocyanate groups. Suitable compounds of this kind are, in particular, the hydroxyl compounds known per se in polyurethane chemistry. The following are examples:

Higher molecular weight polyhydroxyl polyesters of the kind known per se in polyurethane chemistry, i.e. polyhydroxyl polyesters having a molecular weight of between about 250 and 4000, preferably of between about 250 and 2000, for example. These may advantageously be obtained from dicarboxylic acids, hexahydrophthalic acid or adipic acid with excess quanities of diols of the kind mentioned above by way of example. Trifunctional components may, of course, also be added for obtaining a branched product if desired. Suitable examples also include polyhydroxypolyurethanes having a molecular weight of between about 250 and 10000 preferably of between about 250 and 2000 which can be obtained, for example, from the above mentioned diisocyanates and excess quantities of the above mentioned low molecular weight polyols, preferably diols and triols. They also include polyhydroxypolyethers having a molecular weight of between about 250 and 10000 preferably of between about 250 and 2000 of the kind known per se in polyurethane chemistry. These may be obtained by alkoxylation of low molecular weight starter molecules, for example, the low molecular weight polyols mentioned above by way of example or water or amines having at least two active hydrogen atoms. The above mentioned low molecular weight polyhydroxyl compounds are also suitable reactants for the oligourethanes.

The macroscopic properities of the sheet products finally obtained from the process according to the invention can easily be varied by suitable choice of the molecular weight of the polyhydroxyl compounds used as starting materials. Higher molecular weight polyhydroxyl compounds generally result in softer coats and low molecular weight polyhydroxyl compounds in harder coats.

In addition to the polyhydroxyl compounds mentioned above, the reactants for the blocked polyisocyanates used in the process according to the invention may also include, for example, hydroxyl containing epoxides, imide esters, hydantoins, acrylates, hydroxyurethanes and the like.

When the oligourethanes which can be obtained by the process according to the invention are used in combination with reactants for the production of stoving lacquers, preferably reactants having hydroxyl groups, the proportions of the various reactants are generally calculated so that the reaction mixture contains from about 0.1 to 2, preferably about 0.5 to 1.2, hydroxyl groups from the reactants for each isocyanate end group blocked with monohydric alcohol in the oligourethane. If an excess of isocyanate end groups blocked with monohydric alcohols is used, additional isocyanate groups are formed when the oligourethanes are used under stoving conditions in accordance with the invention. These additional isocyanate groups may react, for example, with the active hydrogen atoms present to form urethane bonds and thus bring about cross-linking of the polyurethane formed in the reaction. This frequently results in a desirable increase in the hardness of the sheets obtained by the process according to the invention. The use of excess quantities of hydroxyl compounds leads to an equally desirable increase in the flexibility of the sheets obtained by the process according to the invention. After application, which may be carried out by any of the techniques used for lacquers such as immersion, spraying or brush coating, the coated substrates are exposed to elevated temperatures, preferably in a stoving oven, to bring about the final cross-linking of the coating. The oven temperatures are generally between about $180°$ and $700°$ C, preferably between about $250°$ and $500°$ C. Temperature resistant sheets which also have extremely high chemical and physical resistance are obtained.

The temperature in the stoving oven is generally sufficiently high to destabilize the oligourethane and thus bring about the cross-linking reaction, but the process may be accelerated by the addition of known catalysts for the polyurethane cross-linking reaction.

Example of catalysts which may be used according to the invention may be found in Kunststoff-Handbuch, Volume VII, published by Vieweg and Hochtlen, Carl-Hanser-Verlag Munich 1966, on pages 96 to 102 and in High Polymers, Vol. XVI, Part I, (Polyurethanes-Chemistry) published by Saunders and Frisch, Interscience Publishers, New York 1962, on pages 129 to 217.

It was surprisingly found that the use of organometallic catalysts, preferably organic catalysts containing tin or zinc, brought about a substantial increase in the velocity of the regeneration and condensation of the isocyanate groups so that the reaction time can be considerably shortened or the condensation and stoving temperature employed can be considerably lowered for the same length of time. This is particularly important, for example, for ensuring complete curing on the very high speed wire lacquering machines.

When these catalysts are used, the range between the melting and deblocking or condensation temperature may in individual cases become very small so that processing becomes unreliable.

The following are further examples of suitable catalysts:

1. Aromatic hydroxyl compounds and phenol Mannich bases (see German Patent Application No. 2,325,927), e.g. phenol, isomeric cresols, ethyl phenols, xylenes, chlorophenols, methoxyphenols, nitrophenols, thiophenols, resorcinol, and 2-(dimethylaminomethyl)-phenol and 2-(dimethylaminomethyl)-4-isononylphenol.

The aromatic hydroxyl compounds may either be used as such or in form of polyisocyanates which are blocked with the aromatic hydroxyl compounds. In the latter case the phenol-blocked polyisocyanates as well as the catalysts mentioned under 2.,3., 4. and 5. would act as so-called latend catalysts which are liberated and hence become active only at higher temperatures i.e. at approx. the same temperature at which the isocyanate from the products of the invention is regenerated by heat.

4. Cyclic or bicyclic amidines such as 2,3-N-dimethyltetrahydro-$^1\Delta$-pyrimidine.

5. Organic metal compounds, in particular compounds of lead and/or tin. Particularly suitable organic lead compounds (see U.S. Pat. No. 3,474,075) are tetraphenyl lead, tetraethyl lead, diphenyl lead diacetate and hexaphenyl di-lead.

Suitable tin compounds (see German Auslegeschrift No. 1,272,532 and US Patent No. 3,523,103) include tetra-n-butyl-1,3-diacetoxy-distannoxane, hexaphenyl-di-tin and hexa-n-butyl-di-tin.

The catalysts are generally used in a quantity of between about 0.01 and 5.0% by weight, preferably about 0.1 to 1.0% by weight, based on the blocked isocyanate compounds. No recognizable advantages are obtained by adding larger quantities. In some cases, it is advisable to add the catalysts to the melt only immediately before their application.

The usual additives used in lacquer technology such as pigments and fillers may, of course, also be used. The use according to the invention of oligourethanes which can be obtained by the process according to the invention in combination with polyhydroxyl compounds for the production of stoving lacquers makes it possible, in particular, to produce temperature resistant coatings on metals, ceramics and glass fibers or fabrics. A preferred field of application for the use according to the invention is the coating of wires with lacquers by the known processes of immersion, roller application or suction felt application. Owing to the excellent electric and mechanical properties of the resulting sheets, the process according to the invention is also particularly suitable for the manufacture of insulating fabrics or for impregnating electric motors.

By using suitable mold release agents, for example, it is possible to prevent adherence between the coated substrate and the film obtained after curing.

On this principle, foils may also be produced by the use according to the invention of the oligourethanes obtainable according to the invention.

The invention will now be explained in more detail with reference to practical examples. In these examples, the latent isocyanate group content is given in percent isocyanate i.e. calculated as NCO.

EXAMPLES

EXAMPLE 1

In an apparatus equipped with stirrer, thermometer, reflux condenser, dropping funnel, inlet for inert gas (nitrogen) and heating jacket, 1792 g of tolylene diisocyanate (ratio of isomers 2,4 : 2,6 = 80:20) are continuously added with vigorous stirring and continuous heating from 20° C to 185° C within at the most one-quarter hour to a reaction mixture of 1242 g of benzyl alcohol, 384 g of tripropylene glycol 268 g of trimethylolpropane which has previously been homogenized and briefly degasified at 60° C under a pressure of about 200 Torr.

The reaction mixture is stirred for about 2 hours at 160° to 175° C and the resulting melt, which is at a temperature of 160° C, is briefly degasified under a vacuum of 200 Torr and immediately transferred to cooling belts or plates. The residual isocyanate content of the melt when cold is below 0.1% by weight.

Latent groups in end positions: 12.1% by weight NCO; viscosity at 150° C is 1206 cP.

A 45% by weight solution is prepared by working up 600 g of this oligourethane with 200 g of a polyester (hydroxyl content 12% by weight) of 2 mol of phthalic acid anhydride, 2 mol of trimethylolpropane and 1.5 mol of ethylene glycol, 100 g of an adduct (hydroxyl content 6% by weight) of 1 mol of hexane-1,6-diol, 0.7 mol of trimethylolpropane, 1.8% by weight of $\epsilon$-caprolactam and 1.3 mol of tolylene diisocyanate (mixture of isomers 2,4:2,6 = 80:20) and 100 g of a polyester (6% by weight hydroxyl groups) of 1.6 mol of terephthalic acid ester, 1.2 mol of ethylene glycol and 0.8 mol of glycerol and 0.1% by weight of zinc octoate in a solvent consisting of a mixture of equal parts by weight of diethylene glycol monoethylether and diethyleneglycol monobutylether.

This solution is used to lacquer a copper wire 0.7 mm in diameter by the immersion process in a vertical wire lacquering machine through which the wire is passed 5 times to increase its diameter by 50 μm. The thickness of the film is adjusted by means of felt strippers. Each layer of lacquer is stoved after its application. The length of the oven is 4 m, the oven temperature 400° C. and the rate of feed of the wire through the oven 12 m/min.

The insulating layer of the resulting insulated wire has a softening temperature of about 230° C, a heat shock resistance (own diameter) of about 180° C and good flexibility and abrasion resistance. The wire can be tinned in about 3 seconds in a soldering bath heated to 350° C.

EXAMPLE 2

The following components are reacted together by a similar procedure and under the same temperature conditions and in the same apparatus as described in Example 1:

821 g of benzyl alcohol, 600 g of trimethylolpropane and 1625 g of 4,4'-diisocyanatodiphenylmethane.

The oligourethane obtained from this reaction contains 7.8% by weight of latent isocyanate end groups (calculated as NCO) and has a viscosity at 200° C of 342cP. It has no free isocyanate groups. The product can be used for the purpose according to the invention in combination with the usual reactants.

In a second experiment, the isocyanate component was introduced into the reaction vessel and the alcohol mixture consisting of benzyl alcohol and trimethylolpropane was added continuously with stirring over a period of one-half hour. The reaction was carried out under otherwise the same conditions. The reaction product obtained had a jelly-like consistency and was completely unsuitable for the purpose according to the invention.

EXAMPLE 3

The reaction vessel described in Example 1 contained the following reaction mixture which had been homogenized and degasified at 70° C and 200 Torr:
- 702 g of benzyl alcohol,
- 650 g of 2-ethyl-n-hexanol-1,
- 134 g of dipropylene glycol,
- 216 g of 1,3-bis-hydroxyethyl-5,5- dimethylhydantoin and
- 82 g of glycerol. 957 g of tolylene diisocyanate (mixture of isomers 2,4:2,6 = 80:20) were added to this reaction mixture with vigorous stirring, starting at a temperature of 40° C. The temperature of the mixture rises to about 100°–120° C due to the heat produced by the exothermic reaction. Starting at a temperature of 120° C, the mixture is reacted with 1250 g of 4,4'-diisocyanatodiphenylmethane (temperature rises to about 140°–160° C due to exothermic reaction) and finally, starting at 140° to 175° C, 82 g of glycerol are stirred in and stirring is continued for about 2 hours at 160° to 175° C.

The melt is briefly degasified under vacuum at about 160° C and applied to conveyor belts or metal sheets. The residual isocyanate content of the melt as well as of the cold product is in all cases below 0.1% by weight. The latent isocyanate group content is 11.3% by weight of NCO, the viscosity at 150° C is 2050 cP.

EXAMPLE 4

A homogeneous mixture of 609 g of tolyene diisocyanate (mixture of isomers 2,4:2,6 = 80:20) and 1750 g of 4,4'-diisocyanatodiphenylmethane is directly added at room temperature with vigorous stirring, to a suitably pretreated mixture of the following components contained in an apparatus described in Example 1:
- 444 g of n-butanol,
- 270 g of ethylene glycol monoethylether,
- 174 g of allyl alcohol,
- 429 g of trimethylolpropane and
- 167 g of diphenylether.

The mixture reaches a temperature of about 175 to 190° C within 10 minutes. Stirring is continued for about 3 hours at 175° to 190° C and when the melt has cooled to about 160° C it is degasified at about 300 Torr and transferred to the mold indicated. The residual isocyanate content is less than 0.1% by weight and the proportion of latent isocyanate end groups is 13.0% by weight. The viscosity at 150° C is 1580 cP.

EXAMPLE 5

1320 g of diethylene glycol monomethyl ether, 442 g of trimethylolpropane and 27 g of ethylene glycol are introduced into a stirrer apparatus of the kind described in Example 1 and pretreated as already described. 2550 g of 4,4'-diisocyanatodiphenylmethane are then added with vigorous stirring at a temperature of about 80° to 180° C. When the evolution of heat due to the exothermic reaction has died down, 173 g of ε-caprolactam are added at about 160° C.

When the melt has been stirred, degasified and cooled in the usual form, it has a residual isocyanate content of less than 0.1% by weight and contains 10.2% by weight of latent isocyanate end groups. Its viscosity at 150° C is 2100 cP.

EXAMPLE 6

Liquid isocyanate reaction products are obtained when a reaction mixture of 756 g of benzyl alcohol, 804 g of diethylene glycol monoethyl ether, 375 g of trimethylolpropane and 1760 g of diethylene glycol dimethyl ether is introduced into the stirrer apparatus described in Example 1 and degasified in the usual manner and 1044 g of tolylene diisocyanate (mixture of isomers 2,4:2,6 = 80:20) are added with vigorous stirring at temperatures starting from 30° C and 1125 g of 4,4'-diisocyanatodiphenylmethane are subsequently added with vigorous stirring, after the exothermic effect, at temperatures starting from 90° C.

When the resulting mixture has been stirred for about 2 hours at 120° to 140° C, it has a residual isocyanate content of less than 0.1% by weight, it contains 12.9% by weight of latent isocyanate end groups and has a viscosity at 150° C of 100 cP.

EXAMPLE 7

In a variation of the experiment carried out in Example 6, 936 g of diethylene glycol monomethyl ether, 405 g of ethyl glycol, 336 g of trimethylolpropane, 100 g of butane-1,3-diol and 152 g of ε-caprolactam are introduced into the apparatus described in Example 1 and degasified. Starting at a reaction temperature of 35° to 120° C, 1050 g of 4,4'-diisocyanatodiphenylmethane are added with vigorous stirring over a period of about 20 minutes. 1500 g of 4,4'-diisocyanatodiphenylmethane are then added with vigorous stirring over a period of about 15 minutes, starting at a temperature of 80° to 175° C. When the temperature reaches about 170° to 135° C, the melt is mixed with 2330 g of benzyl alcohol (solvent) and stirred for about 3 hours at 120° to 140° C. At room temperature, for example, the liquid isocyanate reaction product has a residual isocyanate content of less than 0.1% by weight, a latent isocyanate content of 9.5% by weight and a viscosity at 150° C of 107 cP.

600 g of the liquid polyisocyanate described in Example 7 are directly and homogeneously mixed at 50° to 70° C with 200 g of a polyester of 2 mol of phthalic acid anhydride, 2 mol of trimethylolpropane and 1.5 mol of ethylene glycol (hydroxyl content 12% by weight). This homogeneous mixture is adjusted for wire lacquering by diluting it to a concentration of about 40% by weight with equal parts by weight of diethylene glycol dimethylether, diethylene glycol diethylether and ethylene glycol monomethyl ether and adding 0.5% by weight of zinc octoate.

When a copper wire 0.1 mm in thickness is coated with this mixture by the immersion process at an oven temperature of 500° to 550° C, using a felt stripper, an increase in diameter of 12 to 15 μm is obtained by passing the wire six times through the oven at a rate of up to 300 m/min. The lacquer insulated wires manufactured in this way have a failure rate of less than 1 pin hole per 10 m and can be tinned within 2 seconds in a soldering bath heated to 330° C. Their elasticity of expansion is about 330% higher than that of comparable lacquered wires which can be soldered.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of oligourethanes having isocyanate end groups blocked with alkanol and/or cycloalkanol groups by the reaction of aromatic polyisocyanates with monohydric and polyhydric alcohols having aliphatically and/or cycloaliphatically bound hydroxyl groups, characterized in that aromatic polyisocyanates are reacted with about 0.7 to 1.5 times the equivalent quantity, in terms of the NCO/OH reaction, of monohydric and polyhydric alcohols having aliphatically and/or cycloaliphatically bound hydroxyl groups, the proportion of monohydric to polyhydric alcohols being calculated so that from about 30 to 70% of the total quantity of alcoholic hydroxyl groups present consist of hydroxyl groups of one or more monohydric alcohols and about 70 to 30% of the total quantity of hydroxyl groups present consist of hydroxyl groups of one or more polyhydric alcohols, the reaction being carried out either by introducing the total quantity of alcohol component as a mixture into the reaction vessel and then adding the polyisocyanate to this mixture or by introducing at least about 70 equivalent percent, in terms of the NCO/OH reaction, of the alcohol component into the reaction vessel and reacting it with the total quantity of polyisocyanate and thereupon adding the remaining quantity of alcohol to the prepolymer initially obtained which contains free isocyanate groups, at least about 50 equivalents percent of the total quantity of polyhydric alcohol components being already in the alcohol mixture originally introduced into the reaction vessel if the second reaction method mentioned is employed.

2. Oligourethanes obtainable according to the process of claim 1.

3. In an isocyanate polyaddition process for the production of polyurethane resins, the improvement comprising reacting oligourethanes produced by the process of claim 1 with polyhydroxyl compounds.

4. A process for the preparation of oligourethanes having isocyanate end groups blocked with blocking agents selected from the group consisting of alkanols and cycloalkanols comprising (a) introducing monohydric and polyhydric alcohols having aliphatically and/or cycloaliphatically bound hydroxyl groups into a reaction vessel, and
(b) adding aromatic polyisocyanates to said monohydric and polyhydric alcohols in said reaction vessel wherein
  (i) the NCO/OH equivalent ratio is from about 1:0.7 to 1:1.5 and
  (ii) about 30 to 70% of the total quantity of hydroxyl groups consists of hydroxyl groups of monohydric alcohols and about 70 to 30% of the total quantity of hydroxyl groups consists of hydroxyl groups of polyhydric alcohols.

5. The process of claim 4 wherein
(a) at least about 70 equivalent percent, in terms of the NCO/OH reaction, of the monohydric and polyhydric alcohols having aliphatically and/or cycloaliphatically bound hydroxyl groups containing at least about 50 equivalent percent of the total quantity of polyhydric alcohols is introduced in a reaction vessel,
(b) the total quantity of aromatic polyisocyanates is next added to said reaction vessel to form a prepolymer containing free isocyanate groups, and
(c) the remaining equivalent percent of the monohydric and polyhydric alcohols is then added to the reaction vessel containing said prepolymer containing free isocyanate groups 6. The process of claim 4 wherein the NCO/OH equivalent ratio is from about 1:0.95 to 1:1.1.

7. The process of claim 4 wherein about 40 to 60% of the total quantity of hydroxyl groups consists of hydroxyl groups of monohydric alcohols and about 60 to 40% of the total quantity of hydroxyl groups consists of hydroxyl groups of polyhydric alcohols.

8. The process of claim 4 wherein the reaction temperature is from about 0° to 250° C.

9. The oligourethanes produced by the process of claim 4.

10. In an isocyanate polyaddition process for the production of polyurethane resins, the improvement comprising reacting oligourethanes produced by the process of claim 4 with polyhydroxyl compounds.